United States Patent
Combes et al.

(10) Patent No.: US 11,791,759 B2
(45) Date of Patent: Oct. 17, 2023

(54) TOWARDS AN INDUSTRIALLY IMPLEMENTABLE PWM-INJECTION SCHEME

(71) Applicant: Schneider Toshiba Inverter Europe SAS, Pacy sur Eure (FR)

(72) Inventors: Pascal Combes, Vernon (FR); Dilshad Surroop, Saint-Denis (FR); Philippe Martin, Paris (FR); Pierre Rouchon, Meudon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 17/558,228

(22) Filed: Dec. 21, 2021

(65) Prior Publication Data

US 2022/0200507 A1    Jun. 23, 2022

Related U.S. Application Data

(60) Provisional application No. 63/130,079, filed on Dec. 23, 2020.

(51) Int. Cl.
*H02P 27/08* (2006.01)
*H02P 21/22* (2016.01)
*H02M 7/5395* (2006.01)

(52) U.S. Cl.
CPC ........ *H02P 27/085* (2013.01); *H02M 7/5395* (2013.01); *H02P 21/22* (2016.02)

(58) Field of Classification Search
CPC ...... H02M 7/5395; H02P 21/22; H02P 27/085
USPC ........................................ 318/811, 503, 494
See application file for complete search history.

(56) References Cited

U.S. PATENT DOCUMENTS

2006/0138995 A1*  6/2006 Sugita ..................... B60K 6/44
                                                                    318/811

FOREIGN PATENT DOCUMENTS

| EP | 1107448 A2 | 6/2001 |
| EP | 3709500 A1 | 9/2020 |
| EP | 3799293 A1 | 3/2021 |
| JP | 2015223023 A | 12/2015 |
| WO | 2019229885 A1 | 12/2019 |

OTHER PUBLICATIONS

Yamakawa et al. (CN 106537764 B) (A Controller for a Motor System of) Date Published Apr. 5, 2019 (Year: 2019).*
Kobayashi et al. (JP 2007252144 A) (Voltage Conversion Device) Date Published Sep. 27, 2007 (Year: 2007).*
Suzuki et al. (JP 2006230193 A) (Electric Power Steering Apparatus) Date Published Aug. 31, 2006 (Year: 2006).*
European Search Report dated Nov. 10, 2021 for corresponding European Patent Application No. 21305642.7, 5 pages.

(Continued)

*Primary Examiner* — Jorge L Carrasquillo
(74) *Attorney, Agent, or Firm* — Locke Lord LLP

(57) ABSTRACT

A variable speed drive includes an output terminal for delivering a drive voltage; a power inverter for generating the drive voltage; a drive controller for controlling the generation of the drive voltage; and a current sensor for providing a drive current intensity signal to the drive controller. The drive controller includes a PWM generator; a control law module; and a state variable estimator estimating a state variable of the controlled AC electric motor.

14 Claims, 11 Drawing Sheets

(56) References Cited

OTHER PUBLICATIONS

P. Jansen and R. Lorenz, "Transducerless position and velocity estimation in induction and salient AC machines," IEEE Trans. Industry Applications, vol. 31, pp. 240-247, 1995.

S. Ogasawara and H. Akagi, "Implementation and position control performance of a position-sensorless IPM motor drive system based on magnetic saliency," IEEE Transactions on Industry Applications, vol. 34, No. 4, pp. 806-812, 1998.

M. Schroedl, "Sensoriess control of AC machines at low speed and standstill based on the "INFORM" method," in IAS 96. Conference Record of the 1996 IEEE Industry Applications Conference Thirty-First IAS Annual Meeting, vol. 1, 1996, pp. 270-277 vol. I.

E. Robeischl and M. Schroedl, "Optimized INFORM measurement sequence for sensoriess PM synchronous motor drives with respect to minimum current distortion," IEEE Transactions on Industry Applications, vol. 40, No. 2, pp. 591-598, 2004.

G. Wang, L. Yang, G. Zhang, X. Zhang, and D. Xu, "Comparative investigation of pseudorandom high-frequency signal injection schemes for sensoriess IPMSM drives," IEEE Transactions on Power Electronics, vol. 32, No. 3, pp. 2123-2132, 2017.

Q. Gao, G. Asher, M Sumner, and P. Makys, "Position estimation of AC machines over a wide frequency range based on space vector PWM excitation," IEEE Transactions on Industry Applications, vol. 43, pp. 1001-1011, 2007.

C. Wang and L. Xu, "A novel approach for sensoriess control of PM machines down to zero speed without signal injection or special PWM technique," IEEE Transactions on Power Electronics, vol. 19, No. 6, pp. 1601-1607, 2004.

M. Linke, R. Kennel, and J. Holtz, "Sensoriess speed and position control of synchronous machines using alternating carrier injection," in IEEE International Electric Machines and Drives Conference, 2003. IEMDC'03., vol. 2, 2003, pp. 1211-1217 vol.2.

P. Landsmann, D. Paulus, A. Dötlinger, and R. Kennel, "Silent injection for saliency based sensoriess control by means of current oversampling," in 2013 IEEE International Conference on Industrial Technology (ICIT), 2013, pp. 398-403.

D. Surroop, P. Combes, P. Martin, and P. Rouchon, "Adding virtual measurements by PWM-induced signal injection," n American Control Conference, 2020, pp. 2692-2698.

D. Surroop et al., "Sensoriess rotor position estimation by pwm-induced signal injection," in IECON 2020 the 46th Annual Conference of the IEEE Industrial Electronics Society, 2020, pp. 367-372.

D. Surroop, P. Combes, and P. Martin, "A demodulation procedure for multicarrier signals with slowly-varying carriers," ArXiv e-prints, 2020, arXiv:2011.12853 [eess.SP].

D. Surroop et al., "Error estimate in second-order continuous-time sigma-delta modulators," ArXiv e-prints, 2020, arXiv:2011.12877 [eess.SP].

A. K. Jebai, F. Malrait, P. Martin, and P. Rouchon, "Sensoriess position estimation and control of permanent-magnet synchronous motors using a saturation model," International Journal of Control, vol. 89, No. 3, pp. 535-549, 2016.

D. Surroop, P. Combes, P. Martin, and P. Rouchon, "A new demodulation procedure for a class of multiplexed signals," in Annual Conference of the IEEE Industrial Electronics Society (IECON), 2019, pp. 48-53.

J. Sorensen, "ΣΔ-conversion used for motor control," in Proceedings of PCIM Europe 2015; International Exhibition and Conference for Power Electronics, Intelligent Motion, Renewable Energy and Energy Management, 2015, pp. 1-8.

J. Sorensen, D. O'Sullivan, and S. O'Meara, "Part 2: Optimized sigma-delta modulated current measurement for motor control," 2019.

R. Schreier and G. C. Temes, Understanding delta-sigma data converters. New York, NY: Wiley, 2005.

* cited by examiner (a) Measured current $i_s^a$ and its smoothed version (b) Rectangular and trapezoidal masking windows Measured/smoothed currents (left); masking windows (right).

(a) Second-order continuous-time ΣΔ modulator [17]    (b) Impact on error of window regularity: $c_1$ (blue), $c_2$ (orange)

Example of ΣΔ modulator (left); demodulation process asymptotic error (right).

(a) Actual rotor position $\theta$ and its estimate $\hat{\theta}$ (rad)

(b) Error $\theta - \hat{\theta}$ (rad)

Comparison between actual rotor position and position estimated by the proposed approach.

(a) Measured current $i_s^a$ and its smoothed version (b) Covers centered on $t_0$ and $t_1$ Current (left), covers (right)

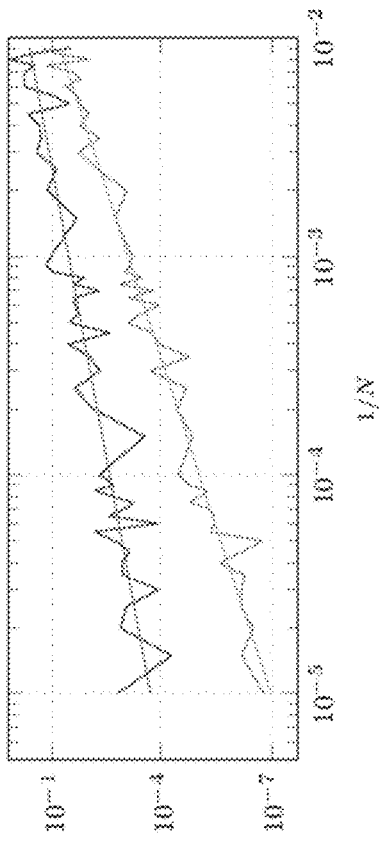

FIG. 10A

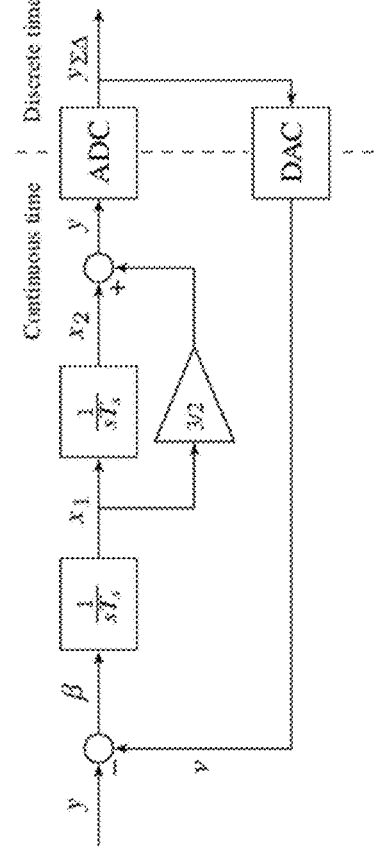

FIG. 10B

(a) Example of continuous second-order $\Sigma\Delta$ modulator [18] (b) Regularity of the window: $c_1$: discontinuous (blue), $c_2$: continuous piecewise linear (orange)

Asymptotic behavior of the error $\|(t^{\alpha\beta}_{s,\Sigma\Delta} - \overline{t^{\alpha\beta}_{s,\Sigma\Delta}})r^T_\varepsilon * \phi - (t^{\alpha\beta}_s - \overline{t^{\alpha\beta}_s})r^T_\varepsilon * \phi\|_2$ (right) as a function of $1/N$.

(a) Position $\theta$, its estimate $\hat{\theta}$ (rad)

(b) Error $\theta - \hat{\theta}$ (rad)

Comparison between actual rotor position and position estimated by the proposed approach.

TOWARDS AN INDUSTRIALLY IMPLEMENTABLE PWM-INJECTION SCHEME

The entire content of the US provisional utility patent application U.S. 63/130,079 filed on 23 Dec. 2020 at the US Patent and Trademark Office is hereby incorporated by reference into the present application.

TECHNICAL FIELD

This disclosure generally pertains to the field of motor control. More precisely, it relates to Variable Speed Drives (VSDs), which are used to control the operation of Alternating Current (AC) electric motors. The focus is on VSDs that rely on Pulse-Width Modulation (PWM) to have continuous control over the speed of the controlled AC motor.

VSDs are typically used as industrial drives in factories, installations, HVAC systems and the like to control e.g. the position, speed and/or torque of an electric motor that is dedicated to a particular task, such as e.g. the operation of a fan or the hoisting of a load.

BACKGROUND ART

In order to perform a closed-loop control of an AC motor, a VSD needs to have real-time information on the operating status of the AC motor. This information might for example be the instantaneous angular position and/or angular velocity of the motor's rotor.

The VSD may obtain this information from dedicated sensors, which are arranged on the motor and monitor the motor's operating status. However, fitting an electric motor with such sensors adds to the complexity and size of the whole drive assembly. The required sensors and sensor cabling also increase the price and reduce the reliability.

This is why so-called "sensorless" VSDs have become more and more common. In these sensorless VSDs, the motor's operating status is estimated on the basis of measurements of the motor's drive current. No additional external sensors are used. In order to improve the estimations, in particular when the motor operates at low velocity, it is a standard procedure to inject an external high-frequency probing signal into the motor's drive voltage.

Document EP 3 709 500 A1 provides an example of sensorless motor control, which relies on the injection of a high-frequency probing signal.

Signal injection is an effective method, but it comes at a price: the ripple it creates may in practice yield unpleasant acoustic noise and excite unmodeled dynamics. In particular, in the very common situation where the electric motor is fed by a PWM inverter, the frequency of the injected probing signal may not be as high as desired so as not to interfere with the PWM (typically, it cannot exceed 500 Hz in an industrial drive with a 4 kHz PWM frequency).

Document EP 3 799 293 A1, published after the priority date of the present application, describes a PWM-based variable speed drive with a sensorless AC motor control that relies on the artefacts induced by the PWM in the measured current, rather than on artefacts induced by an external probing signal, to improve the estimation of the motor's operating status.

In its paragraph [0154] and corresponding FIG. 18, EP 3 799 293 A1 alludes to the presence of periodic spikes in the measured current, which are a result of the PWM commutations. This PWM-inherent noise in the measured current hinders the estimation of the motor's operating status. To address this, EP 3 799 293 A1 teaches a prefiltering of the measured current using a zero-phase moving average.

However, such a prefiltering must be done offline, i.e. it cannot be done in real time, meaning that the control taught by EP 3 799 293 A1 would benefit from further improvements so that it is better suited for standard industrial VSDs.

SUMMARY

Accordingly, it is an object of the present disclosure to provide a PWM-based sensorless variable speed drive without signal injection, which can be implemented on an industrial scale more easily.

According to the present disclosure, this object is achieved with a variable speed drive for the closed loop control of the operation of an AC electric motor based on a given control law, the variable speed drive comprising:

an output terminal for delivering a controlled alternating drive voltage to the controlled AC electric motor;

a solid-state power inverter including solid-state switches for generating the drive voltage by commutating the solid-state switches to invert a provided DC voltage;

a drive controller for controlling the generation of the drive voltage by the power inverter; and a drive current sensing device for measuring the instantaneous intensity of the drive current taken up by the controlled AC electric motor, and for providing the resulting measurements as a drive current intensity signal to the drive controller, wherein the drive controller includes:
a pulse-width modulation generator;
a control law module storing the given control law; and
a state variable estimation module for estimating the instantaneous value of at least one state variable of the controlled AC electric motor, wherein the control law module is adapted to, based on the stored control law and state variable estimates provided by the estimation module, compute a target voltage signal and output the computed target voltage signal to the pulse-width modulation generator, wherein the pulse-width modulation generator is adapted to:
approximate the received target voltage signal with a pulse-width modulated inverter control signal;
control the operation of the power inverter using the inverter control signal, thereby obtaining the drive voltage;
compute, based on the deviation between the inverter control signal and the target voltage signal, a state variable estimation support signal;
extract, from the inverter control signal, a time sequence of the next commutations of the power inverter's solid-state switches; and
output the computed state variable estimation support signal and the extracted commutation time sequence to the state variable estimation module, and wherein the state variable estimation module is adapted to:
estimate the instantaneous value of a state variable of the AC electric motor based on the received state variable estimation support signal and the drive current intensity signal provided by the drive current sensing device, wherein those time segments of the drive current intensity signal, which, according to the received commutation time sequence, correspond to the commutation of one of the power inverter's solid-state switches, are discarded in the state variable estimation as corrupted time segments; and
output the resulting state variable estimate to the control law module.

By extracting a time sequence of the next switch commutations from the inverter control signal, the proposed variable speed drive has information on when the next spikes occur in the measured current signal. The proposed VSD uses this information to discard the corresponding time segments in the current signal. Thanks to this noise rejection, the state variable estimation is improved. This particular switching noise rejection scheme has the advantage that it can be done by the VSD in real time.

Optionally, the variable speed drive according to the present disclosure can have the following features, separately or in combination:

the state variable estimation module is adapted to use a sequence of temporal masking windows, which follows the commutation time sequence, to determine those time segments of the drive current intensity signal, which are discarded;

the full width at maximum, FWM, of the temporal masking windows is greater than or equal to the switching time of the power inverter's solid-state switches;

the temporal masking windows have a discontinuous shape, such as a rectangular shape;

the temporal masking windows have a continuous shape, such as a trapezoidal shape;

a 1-bit delta-sigma modulator adapted to receive the drive current intensity signal in analog form from the drive current sensing device, convert the received analog drive current intensity signal into a binary bitstream, and output the binary bitstream to the drive controller.

the delta-sigma modulator is a second-order continuous-time delta-sigma modulator;

a multi-bit analog-to-digital converter adapted to receive the drive current intensity signal in analog form from the drive current sensing device, convert the received analog drive current intensity signal into a digital drive current intensity signal, and output the digital drive current intensity signal to the drive controller;

the variable speed drive is a three-phase variable speed drive, and thus the controlled alternating drive voltage is a three-phase voltage, the power inverter is a three-phase inverter, and the drive current intensity signal is a three-phase current signal;

three 1-bit delta-sigma modulators, one for each phase of the drive current intensity signal.

three multi-bit analog-to-digital converters, one for each phase of the drive current intensity signal.

According to a further aspect, the present disclosure also relates to an electric drive assembly comprising a synchronous reluctance motor or a permanent-magnet synchronous motor and a variable speed drive as defined above for controlling the motor.

According to yet a further aspect, the present disclosure also relates to a method of controlling, in a closed loop, the operation of an AC electric motor based on a given control law, the method comprising the following steps:

a) measuring the instantaneous intensity of the drive current taken up by the controlled AC electric motor;

b) estimating the instantaneous value of a state variable of the AC electric motor using the measured drive current intensity;

c) computing, based on the given control law and the estimated state variable, a target voltage signal;

d) approximating the computed target voltage signal with a pulse-width modulated inverter control signal;

e) computing, based on the deviation between the inverter control signal and the target voltage signal, a state variable estimation support signal;

f) generating a controlled alternating drive voltage by inverting a provided DC voltage through the commutation of solid-state switches in accordance with the inverter control signal; and g) delivering the generated drive voltage to the controlled AC electric motor;

wherein the state variable estimation according to step b):
relies on the state variable estimation support signal computed in step e) as an additional input together with the drive current intensity measured in step a); and
is suspended during each commutation of one of the solid-state switches.

BRIEF DESCRIPTION OF DRAWINGS

Exemplary embodiments of the present disclosure will now be described in detail with reference to the accompanying drawings, in which:

FIG. 10A is a block diagram illustrating an example modulator.

FIG. 10B is a graph showing demodulation process asymptotic error.

DESCRIPTION OF EXEMPLARY EMBODIMENTS

Figure 1:
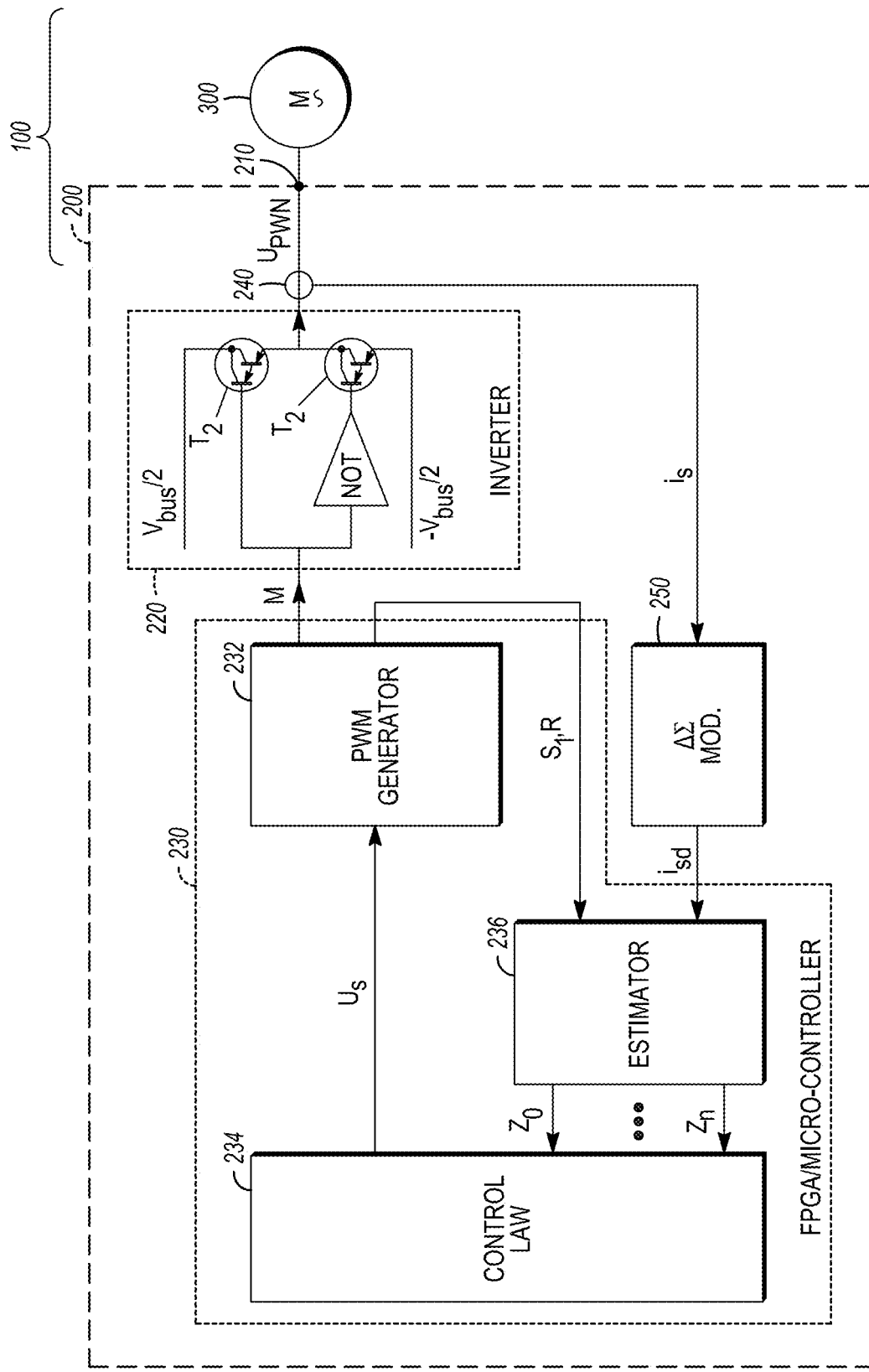
FIG. 1 is a block diagram of an electric drive assembly of the present disclosure, with a variable speed drive and an AC electric motor.

A. Exemplary Setup of a Variable Speed Drive According to the Present Disclosure FIG. 1 is a schematic diagram of an electric drive assembly 100 according to the present disclosure. The electric drive assembly 100 comprises a variable speed drive, or VSD, 200 and an AC electric motor 300.

The electric drive assembly 100 may be used in diverse industrial settings. For example, it may drive a fan of a heating, ventilation and air conditioning (HVAC) system. As another example, it may also be used to drive a water pump of a sewage installation. Many other industrial applications can be envisaged by the skilled person.

Preferably, the AC electric motor 300 is a synchronous motor, such as a permanent magnet synchronous motor, or PMSM, or a synchronous reluctance motor, or SynRM.

The purpose of the variable speed drive 200 is to control the proper operation of the electric motor 300. Thanks to the variable speed drive 200, the motor 300 can be operated at the right speed at the right time, depending on the application. The variable speed drive 200 may also allow to control the torque output of the electric motor 300 to its load.

The variable speed drive 200 controls the electric motor 300 in a closed loop. This means that the variable speed drive 200 constantly receives feedback on the instantaneous status of the motor 300 during the control of the motor. The variable speed drive 200 adjusts its control of the electric motor 300 based on a given control law. The specifics of the control law depend on the type of application of the electric motor 300, and on the type of electric motor.

With reference to FIG. 1, the variable speed drive 200 comprises an output terminal 210, a solid-state power inverter 220, a drive controller 230, a drive current sensing device or current sensor 240, and a delta-sigma modulator 250.

The variable speed drive 200 is electrically connected to the electric motor 300 via its output terminal 210. The power output 210 delivers a controlled alternating drive voltage $u_{pwm}$ to the AC electric motor 300. The drive voltage $u_{pwm}$ is a modulated signal whose amplitude is determined by the DC voltage Vbus applied to the power inverter 220. The modulation frequency of the drive voltage $u_{pwm}$ depends on the switching frequency of the power inverter 220. The modulated drive voltage $u_{pwm}$ emulates an ideal sinusoidal drive voltage whose amplitude and frequency determine the operation of the electric motor 300.

The power inverter 220 generates the drive voltage $u_{pwm}$ by chopping up the DC voltage Vbus with the help of solid-state switches T1, T2. More precisely, the drive voltage $u_{pwm}$ results from the inversion of the DC voltage Vbus, which is achieved by commutating the solid-state switches T1, T2 at a high frequency.

The solid-state switches T1, T2 may be implemented as insulated-gate bipolar transistors (IGBTs) or as metal-oxide-semiconductor field-effect transistors (MOSFETs).

The skilled person will note that the diagram of FIG. 1 shows a single-phase control. This is only for simplification. Typically, the electric motor 300 will be a three-phase motor. In this case, the power inverter 220 generates a drive voltage for each of the three phases of the motor. The power inverter 220 then has a total of six switches instead of the two shown in FIG. 1.

The current sensor 240 of the VSD 200 measures the instantaneous intensity of the drive current taken up by the electric motor 300. The current sensor 240 provides its measurements as an analog drive current intensity signal $i_s$ to the delta-sigma modulator 250.

According to the present disclosure, the motor control by the VSD 200 is a so-called "sensorless" control. This means that the control feedback entirely relies on the current measurements provided by the current sensor 240. There are no external sensors mounted on the motor 300, such as shaft encoders and the like, to provide feedback to the VSD 200 on the motor status.

The drive controller 230 controls the generation of the drive voltage $u_{pwm}$ by the power inverter 220. This is done on the basis of an inverter control signal M provided by the drive controller 230 to the power inverter 220.

The drive controller 230 may be implemented as a microcontroller or a field programmable gate array (FPGA).

According to the present disclosure, the drive controller 230 includes a pulse-width modulation, or PWM, generator 232, a control law module 234 storing the given control law, and a state variable estimation module 236.

The control law module 234 is adapted to, based on the stored control law and state variable estimates $z_0$ to $z_n$ provided by the estimation module 236, compute a target voltage signal $u_s$ and output the computed target voltage signal $u_s$ to the PWM generator 232.

The target voltage signal $u_s$ represents the analog voltages that must be applied to the stator windings of the electric motor 300 to obtain the desired speed or torque from the motor 300.

Since the variable speed drive 200 relies on pulse-width modulation, the analog voltage corresponding to the target voltage signal $u_s$ is not directly applied to the electric motor 300. Rather, the target voltage signal $u_s$ is fed to the PWM generator 232 to be approximated by the pulse-width modulated inverter control signal M, which in turn is used to control the power inverter 220.

The pulse-width modulation generator 232 may apply three-phase pulse-width modulation with single carrier to generate the inverter control signal M (i.e. the approximation of the target voltage signal $u_s$).

Alternatively, the PWM generator may also apply three-phase pulse-width modulation with interleaved carriers to generate the inverter control signal M.

The PWM generator 232 may of course also use other PWM schemes to generate the inverter control signal M.

According to the present disclosure, the PWM generator 232 has the particularity that it computes, based on the deviation between the inverter control signal M and the target voltage signal $u_s$, a state variable estimation support signal $s_1$, and outputs the computed state variable estimation support signal $s_1$ to the state variable estimation module 236.

Moreover, the PWM generator 232 extracts a time sequence R of the next commutations of the solid-state switches T1, T2 from the inverter control signal M. This time sequence R is also output by the PWM generator 232 to the state variable estimation module 236.

The state variable estimation module or estimator 236 estimates the instantaneous value of one or more state variables of the AC electric motor 300 based on the drive current intensity signal $i_s$ provided by the drive current sensor 240.

Figure 2:
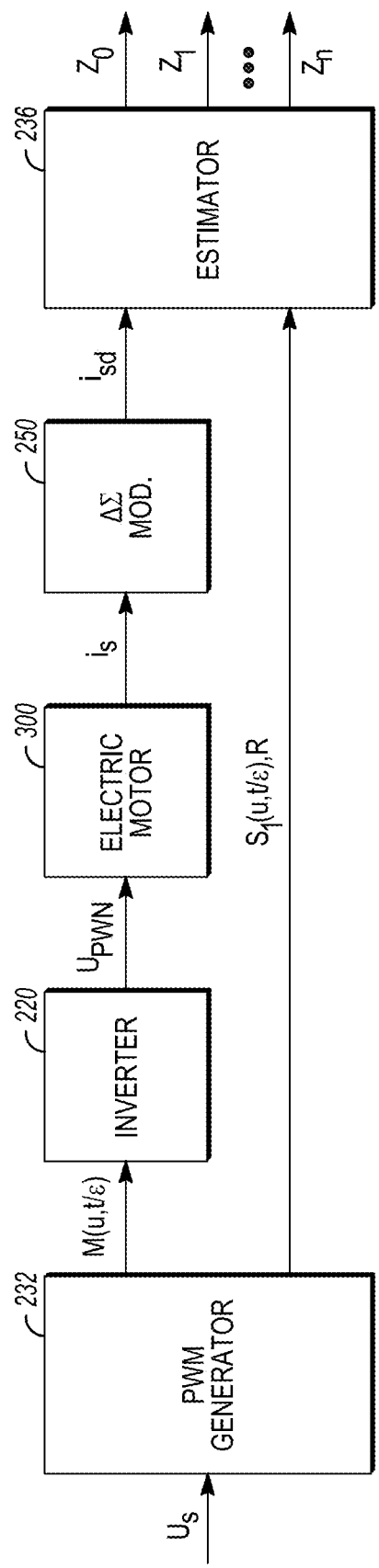
FIG. 2 is a block diagram illustrating the signal flow and processing in the electric drive assembly of FIG. 1.

As shown in FIGS. 1 and 2, the estimator 236 may estimate several state variables $z_0$ to $z_n$. These state variables may e.g. correspond to the rotor position of the electric motor, the angular velocity of the motor's rotor, etc.

According to the present disclosure, the estimator 236 also uses the estimation support signal $s_1$ to estimate the value of at least one of the state variables $z_0$ to $z_n$.

The estimator 236 uses the commutation time sequence R received from the PWM generator 232 to reject noise in the drive current intensity signal $i_s$, as will be explained in more detail below.

The estimator 236 provides the state variable estimates $z_0$ to $z_n$ to the control law module 234. The control law module 234 uses these estimates and the stored control law in order to determine the target voltage signal $u_s$.

The delta-sigma modulator 250 is a 1-bit modulator, which receives the analog drive current intensity signal $i_s$ from the drive current sensing device 240, converts the received analog drive current intensity signal $i_s$ into a binary bitstream $i_{sd}$, and outputs the binary bitstream $i_{sd}$ to the drive controller 230, that is, to the estimator 236. The estimator 236 manipulates the received bitstream $i_{sd}$ to derive its state variable estimates $z_0$ to $z_n$ therefrom. In particular, the estimator 236 may apply different filters, such as finite impulse response, FIR, filters to the bitstream $i_{sd}$. The processing performed by the estimator 236 on the bitstream $i_{sd}$ may correspond to the one detailed in paragraphs [0057] to [0066] of EP 3 709 500 A1. The corresponding disclosure is hereby incorporated by reference into the present application.

In a preferred embodiment, the modulator 250 may be a second-order continuous-time delta-sigma modulator.

In an alternative embodiment not represented in FIGS. 1 and 2, the delta-sigma modulator 250 is replaced by a fast multi-bit analog-to-digital converter (ADC). This multi-bit ADC converts the analog drive current intensity signal $i_s$ into a digital drive current intensity signal $i_{sd}$. It then outputs the digital current signal $i_{sd}$ to the estimator 236.

FIG. 2 shows the signal flow between the different components of the electric drive assembly 100 of FIG. 1. The PWM generator 232 receives the target voltage signal $u_s$ from the control law module 234. Using pulse-width modulation, it approximates the target voltage signal $u_s$ by an inverter control signal M (u, t/ε). The inverter control signal M is fed to the power inverter 220. Based on this control signal M, the inverter 220 delivers a drive voltage $u_{pwm}$ to the electric motor 300. With the current sensor 240, the current $i_s$ in the motor's stator windings is measured, and the measured current signal is then converted into the binary bitstream $i_{sd}$ in the delta-sigma modulator 250. The bitstream $i_{sd}$ is then fed to the estimator 236. The estimator 236 also receives the estimation support signal $s_1$ (u, t/ε) and the commutation time sequence R from the PWM generator 232. The estimator 236 provides estimates of different motor state variables $z_0$ to $z_n$ based on the received inputs.

Figure 3:
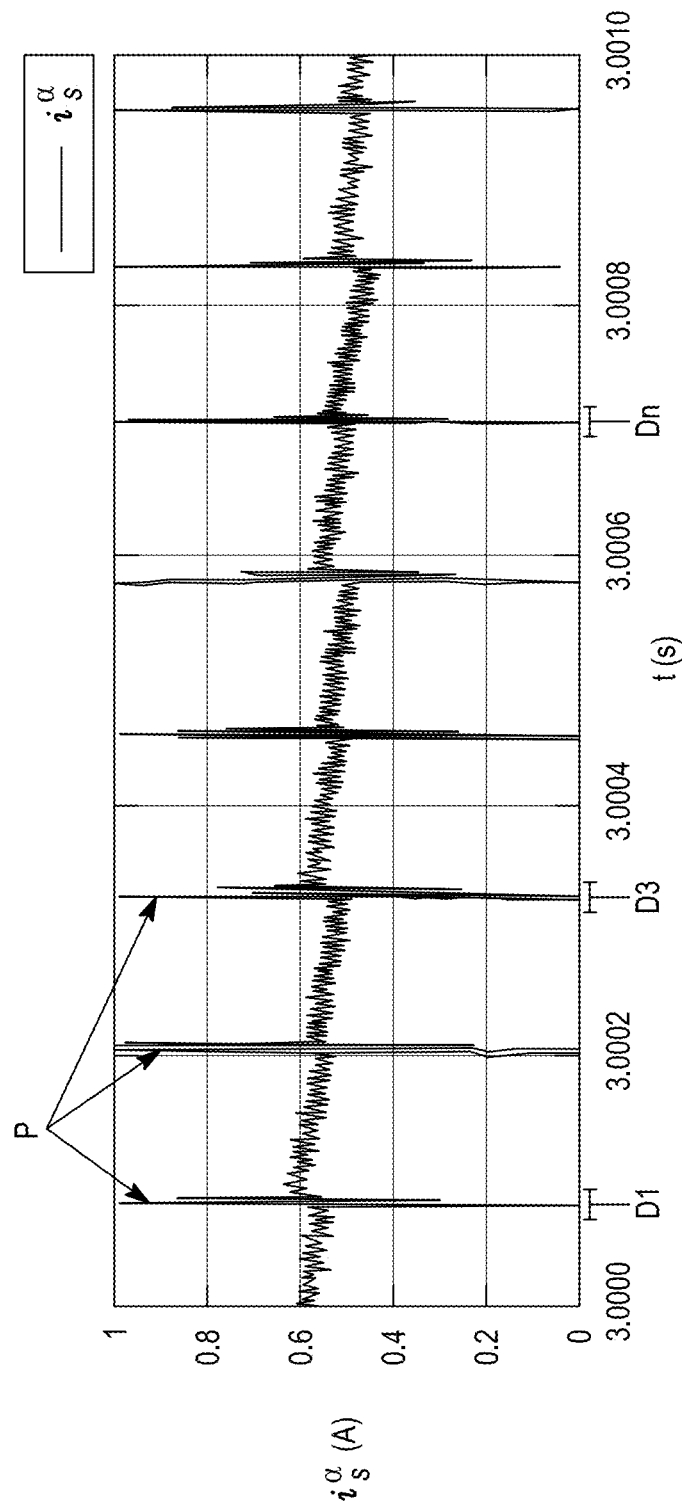
FIG. 3 is a graph illustrating the recurring noise spikes in the measured drive current intensity signal.

FIG. 3 is an illustration of a typical analog current signal $i_s^a$ measured as a function of time t by the current sensor 240. The current signal $i_s^a$ exhibits a strong perturbation P at each commutation of one of the solid-state switches T1, T2. The perturbations P are current spikes that are due to the discharge of parasitic capacitors in the solid-state switches T1, T2. Such perturbations P may corrupt the state variable estimation performed by the estimator 236.

According to the present disclosure, in order to address this, the estimator 236 suspends the state variable estimation during each commutation of one of the solid-state switches T1, T2. More precisely, those time segments of the drive current intensity signal $i_s^a$, which, according to the received commutation time sequence R, correspond to the commutation of one of the power inverter's solid-state switches T1, T2, are discarded by the estimator 236 in the state variable estimation as corrupted time segments.

The corrupted time segments are labelled D1, ..., D3, ..., Dn in FIG. 3.

Figure 4:
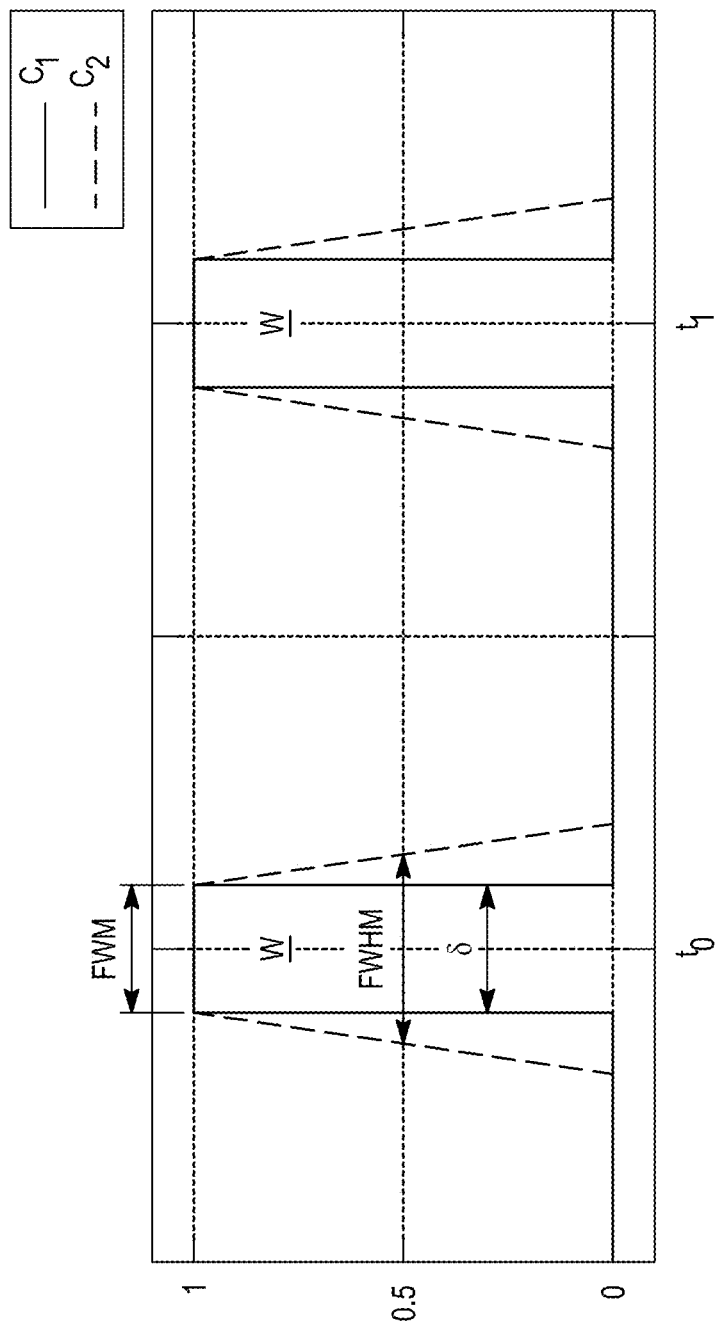
FIG. 4 is a graph showing two different temporal masking window sequences according to the present disclosure.

As shown in FIG. 4, preferably, the state variable estimation module 236 uses a sequence of temporal masking windows W, which follows the commutation time sequence R, to determine those time segments Dn of the drive current intensity signal $i_s^a$, which are discarded.

Different types of masking window sequences may be used depending on the specific application. The full width at maximum, FWM, of the temporal masking windows W is preferably greater than or equal to the switching time δ of the power inverter's solid-state switches T1, T2. In particular, the FWM may be greater than or equal to the characteristic time of a perturbation P.

FIG. 4 depicts two possible masking window sequences c1 and c2.

Sequence c1, which is identified by a solid line, is a succession of rectangular masking windows whose width is equal to the switching time δ of the solid-state switches T1, T2. The rectangular sequence c1 works well in a variable speed drive embodiment, which has a fast multi-bit analog-to-digital converter instead of the 1-bit delta-sigma modulator 250. However, because the rectangular sequence c1 is discontinuous, it is less suited for use with the bitstream output $i_{sd}$ of the delta-sigma modulator 250.

Sequence c2, which is identified by a dashed line, is a succession of trapezoidal masking windows whose full width at half maximum, FWHM, is greater than the switching time δ of the solid-state switches T1, T2. This type of sequence is better adapted for an application to the bitstream output $i_{sd}$ of the delta-sigma modulator 250 because it is continuous. The sequence c2 is also piecewise linear.

Figure 5:
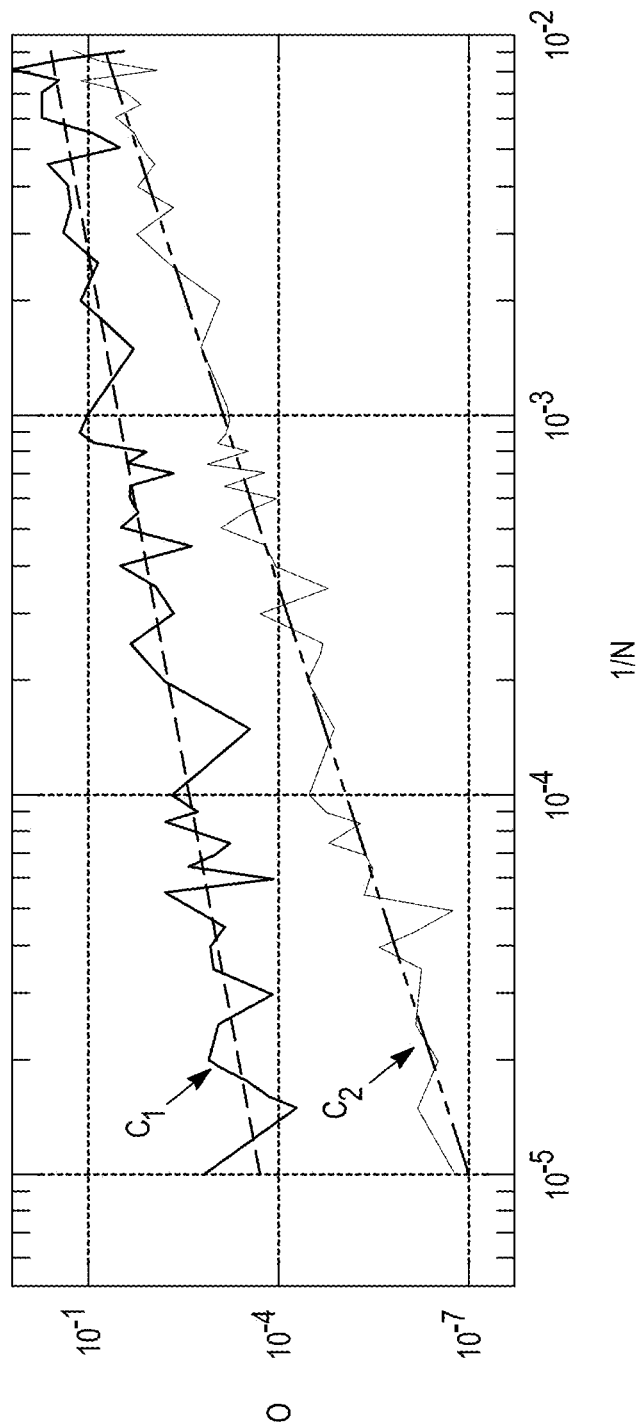
FIG. 5 is a graph showing the respective asymptotic error for each of the two sequences of FIG. 4.

FIG. 5 illustrates the asymptotic error O introduced by the two masking window sequences c1 and c2 as a function of the inverse of the oversampling ratio N of the delta-sigma modulator 250. It is clear from FIG. 5 that the error O is smaller when using the trapezoidal sequence c2.

The variable speed drive configuration of the present disclosure is in line with the requirements of an industrial VSD. The hardware used in the VSD according to the present disclosure may preferably include standard current sensors connected to 1-bit delta-sigma modulators, and a drive controller in the form of an FPGA, which processes the bitstreams from the delta-sigma modulators. In this configuration, the delta-sigma modulators act as the first stage of a delta-sigma analog-to-digital converter (ADC), and the FPGA performs the necessary signal processing (usually sinc and decimation filtering) to form a complete delta-sigma ADC. The state variable estimates are then directly extracted from the modulator bitstreams, preferably by a generalized sinc filter. The signal processing required for the extraction is then included in the programming of the FPGA.

The teachings of the present disclosure may also be applied to the control of other types of actuators. For example, one may think of controlling the operation of an electromagnet in a magnetic bearing, or of a solenoid valve of a hydraulic or pneumatic cylinder.

B. A First Scheme to Estimate the Rotor Position of a Permanent Magnet Synchronous Motor Towards an Industrially Implementable PWM-Injection Scheme We show how the rotor position of a PWM-fed PMSM can be recovered, even at low velocity or standstill, from the measured currents. The method is based on the excitation created by the PWM, without the need for an external probing signal. One originality of the approach is that we directly process the bitstream output by a Sigma-Delta modulator, hence do not require special derivative current sensors nor fast ADCs, thereby opening the way for an effective implementation in an industrial drive.

I. Introduction

Signal injection, introduced in [1], is an effective method for sensorless control of AC motors at low velocity. It consists in superimposing a fast-varying probing signal to the base control law. The current ripple so created provides information on the rotor position if properly decoded. Unfortunately, the probing signal creates acoustic noise and may excite mechanical resonances; for systems controlled through Pulse Width Modulation (PWM), the injection frequency is moreover inherently limited by the PWM frequency, which increases torque ripple.

An appealing idea is to dispense with an external probing signal, and to rely instead on the current ripple naturally created by the PWM. Three main issues must be addressed: i) understand the information encoded in the current ripple; ii) properly demodulate it to extract the rotor position; iii) do it without a "fast" Analog to Digital Converter (ADC) and adapted processing power. Points i) and ii) must of course be dealt with also for signal injection with a probing signal, but are now more complicated. Point iii) is specific to PWM injection, as information is needed inside a PWM cycle, whereas in an industrial drive, usually only one current measurement is acquired and processed per PWM cycle; the technology for "fast" acquisition and processing (fast meaning here about 250 kHz) indeed exists, but is too expensive for implementation in an industrial drive. Several schemes have been proposed; some relying on a modified PWM scheme [2] or through the injection of test sequences [3]-[5]. Whatever the scheme, the problem of estimating the rotor position more or less amounts to estimating the slope of the triangular-shaped current ripple. This can be done with specific current derivative sensors [3], [6], which are experimental devices not found on industrial devices. On the other hand with regular current sensors, the slope can be estimated by the difference between two current samples [7], [8]. But with only two points per PWM signal edge, the estimate is easily corrupted by noise. To achieve better accuracy, a high resolution and high speed sampling ADC is required [7], [9].

In this paper, building on ideas of [10]-[13], we propose and test a scheme to estimate the rotor position of a Permanent Magnet Synchronous Motor (PMSM) that exploits (nearly) all the information in PWM-induced ripple—hence is much more robust than two-point slope estimation—, and that is moreover compatible with an industrial drive hardware. The hardware comprises usual current sensors connected to 1-bit $\Sigma\Delta$ modulators, and an FPGA processing the modulators bitstreams. This configuration is common in recent industrial drives, where the modulators serve both for galvanic isolation and as the first stage of a $\Sigma\Delta$ ADC [14], [15]; the FPGA implements the necessary signal processing (usually sinc and decimation filters) to form a complete $\Sigma\Delta$ ADC. The proposed scheme extracts the rotor position directly from the modulators bitstreams by a kind of generalized sinc filter, and can be programmed on the FPGA without further modifications.

II. Virtual Measurement and Rotor Position Extraction for the Pmsm

A. Model of the PWM-fed PMSM

Consider the state-space model of a PMSM in the dq frame $$d\phi_s^{dq}/dt = u_s^{dq} - R_s i_s^{dq} - \omega \mathcal{J} \phi_s^{dq}, \quad (1a)$$

$$J/n\, d\omega/dt = i_s^{dq\,T} \mathcal{J} \phi_s^{dq} - T_l, \quad (1b)$$

$$d\theta/dt = \omega, \quad (1c)$$

where $\phi_s^{dq}$ is the stator flux linkage, $\omega$ the rotor (electric) angular velocity, $\theta$ the rotor (electric) angular position, $i_s^{dq}$ the stator current, $u_s^{dq}$ the stator voltage, and $T_l$ the load torque; $R_s$ the stator resistance, $J$ the moment of inertia and $n$ the number of pole pairs. For simplicity, we assume no magnetic saturation, i.e. linear current-flux relations $$L_d i_s^d = \phi_s^d - \phi_m \quad (2a)$$

$$L_q i_s^q = \phi_s^q, \quad (2b)$$

With $\phi_m$ the permanent magnet flux; see [16] for a detailed discussion of magnetic saturation in the context of signal injection. The input is the voltage $u_s^{abc}$ through the relation $u_s^{dq} = \mathcal{R}(-\theta)C\, u_s^{abc}$, where $$\mathcal{R}(\theta) := \begin{pmatrix} \cos\theta & -\sin\theta \\ \sin\theta & \cos\theta \end{pmatrix}$$

is the rotation matrix with angle $\theta$ and $$C := \sqrt{\frac{2}{3}} \begin{pmatrix} 1 & -1/2 & -1/2 \\ 0 & \sqrt{3}/2 & -\sqrt{3}/2 \end{pmatrix}$$

is the Clarke transformation. As we are concerned with sensorless control, the only measurement is the current $i_s^{abc} = C^T \mathcal{R}(\theta) i_s^{dq}$, or equivalently $i_s^{\alpha\beta} = \mathcal{R}(\theta) i_s^{dq}$ since $i_s^a + i_s^b + i_s^c = 0$ (we assume the motor is star connected).

The impressed voltage is the PWM encoding $u_{pwm}^{abc}(t)$ of $u_s^{abc}(t)$; it can be written as $$u_{pwm}^{abc}(t) = u_s^{abc}(t) + s_0^{abc}(u_s^{abc}(t), t/\varepsilon),$$

where $s_0^{abc}(u_s^{abc}(t), t/\varepsilon) := u_{pwm}^{abc}(t) - u_s^{abc}(t)$ and $\varepsilon$ is the PWM period. Thus defined $s_0^{abc}$ is 1-periodic with zero mean in the second argument; it can be seen as a rectangular injection signal induced by the PWM that creates a (nearly) triangular current ripple.

B. Extraction of the Rotor Position from the Virtual Measurement

Slightly generalizing the second-order averaging analysis of [10] to the multiple-input multiple-output case, the effect of PWM-induced signal injection can be analyzed as follows. Consider the system $$\dot{x} = f(x) + g(x)(u + s_0(u, t/\varepsilon)),$$

$$y = h(x),$$

where u is the control input, y is the measured output, $\varepsilon$ is the PWM period, and $s_0$ is 1-periodic in the second argument, with zero mean in the second argument. Then $$y(t) = h(\bar{x}(t)) + \varepsilon h'(\bar{x}(t))g(\bar{x}(t))s_1(u(t), t/\varepsilon) + O(\varepsilon^2),$$

where $\bar{x}(t)$ is the solution of the system without injection $\dot{\bar{x}} = f(\bar{x}) + g(\bar{x})u$, and $s_1$ is the zero-mean primitive in the second argument of $s_0$. The quantity $\varepsilon h'(\bar{x}(t))g(\bar{x}(t))s_1(u(t), t/\varepsilon)$ is the ripple caused on the output y by the excitation signal $s_0(u(t), t/\varepsilon)$; though small, it contains valuable information when properly processed. Moreover, the actual measurement $y_a(t) := h(\bar{x}(t))$ and the virtual measurement $y_v(t) := \varepsilon h'(\bar{x}(t))g(\bar{x}(t))\mathcal{A}(u(t))$ can be extracted from the physical measurement y(t) with an accuracy of order $\varepsilon^2$, see [10], [12]; the matrix $\mathcal{A}(u(t))$, which can be computed online, is defined by $\mathcal{A}(v) := \int_0^1 s_1(v,\tau) r^T(v,\tau) d\tau$, where the demodulating basis $r(v,\tau)$ can be chosen at will, provided it has the same dimension as $s_1$ and is 1-periodic in the second argument.

For the PMSM (1)-(2) with physical measurement $i_s^{\alpha\beta}$, $y_a = i_s^{\alpha\beta}$ and $y_v = \mathcal{S}(\bar{\theta}) \mathcal{A}^{\alpha\beta}(u^{abc})$, where $\mathcal{A}^{\alpha\beta}$ is defined by $\mathcal{A}^{\alpha\beta}(v^{abc}) := \int_0^1 s_1^{\alpha\beta}(v^{abc},\tau) r^T(v^{abc},\tau) d\tau$ with $s_1^{\alpha\beta} := C\, s_1^{abc}$, and $\mathcal{S}(\theta)$ is the saliency matrix $$\mathcal{S}(\bar{\theta}) := \frac{L_d + L_q}{2 L_d L_q} \begin{pmatrix} 1 + \frac{L_q - L_d}{L_d + L_q}\cos 2\theta & \frac{L_q - L_d}{L_d + L_q}\sin 2\theta \\ \frac{L_q - L_d}{L_d + L_q}\sin 2\theta & 1 - \frac{L_q - L_d}{L_d + L_q}\cos 2\theta \end{pmatrix}.$$

If the motor has geometric saliency, i.e. if $L_d$ and $L_q$ are sufficiently different, the rotor position $\theta(t)$ can then be computed from $y_v(t)$ and $\mathcal{A}^{\alpha\beta}(u^{abc}(t))$, see [11] for details.

The demodulation process to estimate $y_v(t)$ and $\mathcal{A}^{\alpha\beta}(u^{abc}(t))$ is as follows, see [10], [12] for a detailed analysis:

1) define the kernel filter $\phi(t):=2\mathcal{K}(t)-\mathcal{K}(t-\varepsilon)$, where $\mathcal{K}:=1/\varepsilon^2 1_{[0,\varepsilon]} * 1_{[0,\varepsilon]}$ is the kernel of a double moving average with window $[t,t-\varepsilon]$; it is but a "corrected" sinc2 filter similar to the second stage of a $\Sigma\Delta$ ADC
2) choose a demodulating basis r, see section II-C
3) filter with $\phi$ the known signal $s_1^{abc}(u_s^{abc}(t),t/\varepsilon)r^T(u_s^{abc}(t),t/\varepsilon)$; this yields $\mathcal{A}^{\alpha\beta}(u^{abc}(t))$ with an $\mathcal{O}(\varepsilon^2)$ error
4) filter with $\phi$ the known signal $i^{\alpha\beta}r^T(u_s^{abc}(t),t/\varepsilon)$; this yields $y_v(t)$ with an $\mathcal{O}(\varepsilon^2)$ error.

On the other hand the measured signal $i^{\alpha\beta}(t)$ is also filtered with $\phi$, to yield $y_a(t)=\overline{\iota^{\alpha\beta}}(t)$ with an $\mathcal{O}(\varepsilon^2)$ error; $y_a(t)$ is not needed to recover the rotor position, but is used in the motor control law.

C. Choosing a Demodulating Basis

Figure 6A:
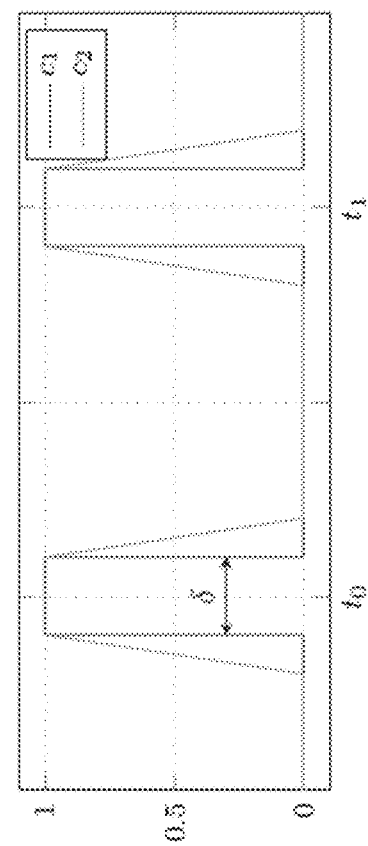
FIG. 6A is a graph showing measured current and its smoothed version.

Due to parasitic effects in the drive power electronics the measured current $i_s^{\alpha\beta}$ is corrupted by huge spikes at each PWM commutation, see FIG. 6a. In [11], the measurements were simply smoothed offline, and the data processed with the demodulating basis $r:=s_1^{\alpha\beta}$. Using a (non-causal) smoother ensures no phase lag is added, see FIG. 6a, but is of course not doable online.

Figure 6B:
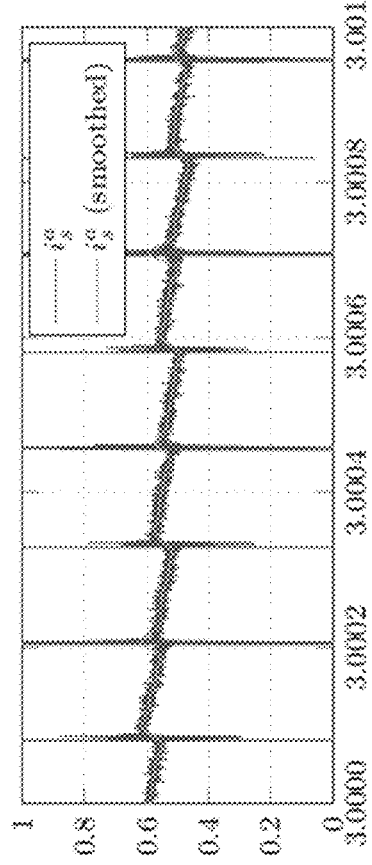
FIG. 6B is a graph showing a rectangular and trapezoidal masking windows.

As the location and duration of the spikes is approximately known (less than about 5% of the PWM period at each commutation), a possible solution for an online implementation is simply to discard the corrupted data by using a masking window $c(t)$ synchronized with the PWM commutations ($c(t):=1$ to discard the signal); $r:=s_1^{\alpha\beta}(1-c)$ is then selected for the demodulating process. The obvious and simplest choice for c is a rectangular window starting at the PWM commutation ($c_1$ in FIG. 6b); this works fine when the measured signal $i_s^{\alpha\beta}$ is directly available thanks to a fast ADC, but turns out to affect the quality of the demodulation when its $\Sigma\Delta$-encoded bitstream is directly manipulated, see section III. A better choice is then a trapezoidal window starting slightly before each commutation ($c_2$ in FIG. 6b).

III. Processing Directly the Sigma-Delta Bitstream

Figure 7A:
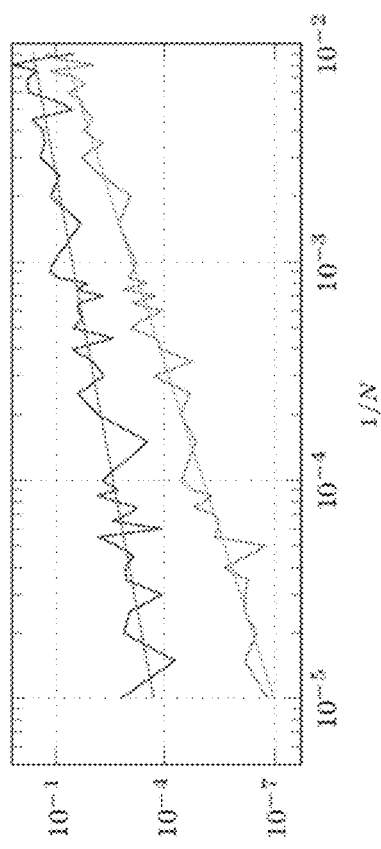
FIG. 7A is a block diagram illustrating an example modulator.
Figure 7B:
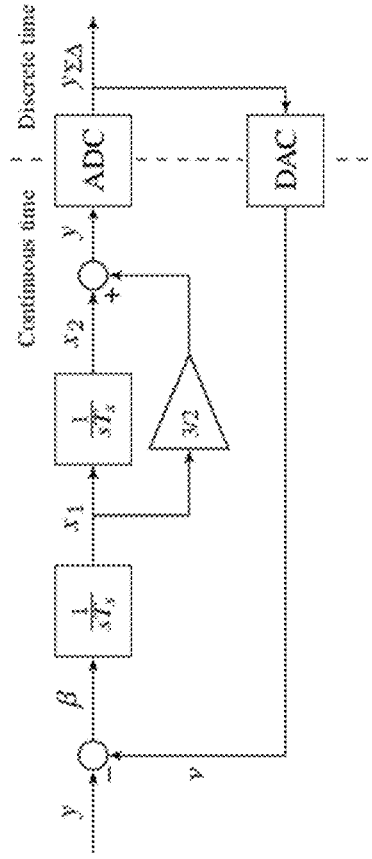
FIG. 7B is a graph showing demodulation process asymptotic error.
Figure 8A:
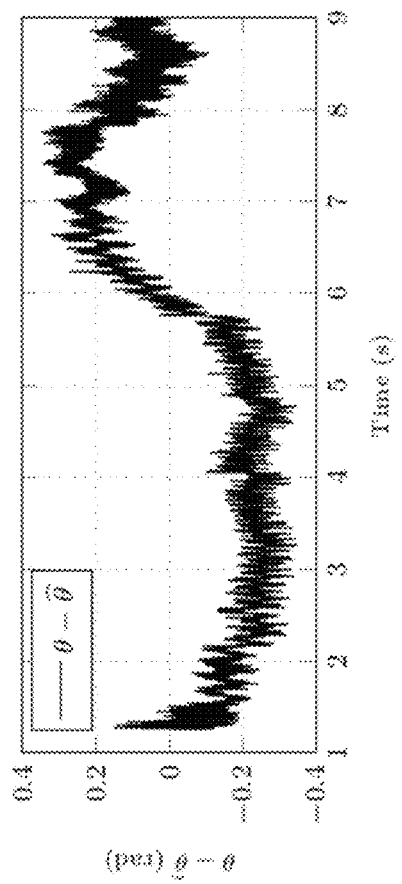
FIG. 8A is a graph showing an actual rotor position and its estimate.
Figure 8B:
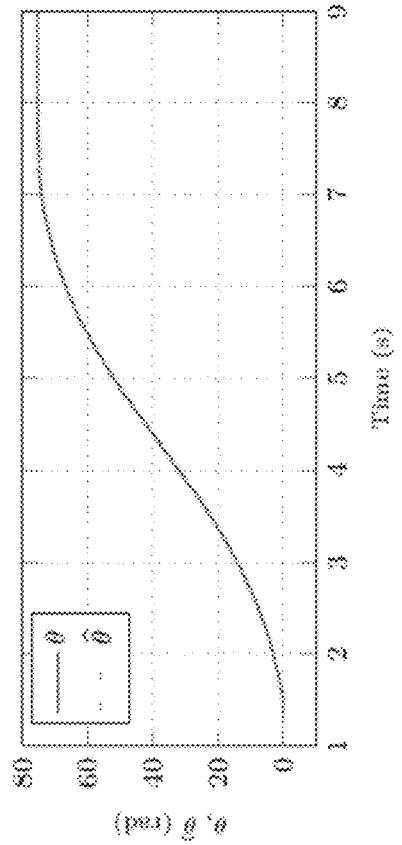
FIG. 8B is a graph showing error between the actual rotor position and its estimate.

Using the recent results in [13], it turns out that if the demodulation process of section II-B is applied directly to the bitstream $i_{s,\Sigma\Delta}^{\alpha\beta} \in \{0,1\}$ output by the second-order continuous-time $\Sigma\Delta$ modulator of FIG. 7a, then the estimation of the virtual output $y_v$ is the same as if it were applied to the (unavailable) analog measurement $i_s^{\alpha\beta}$, up to an error $\mathcal{O}(1/N^j)$, where N is the modulator oversampling ratio. The total error with respect to the true $y_v$ is therefore $\mathcal{O}(\varepsilon^2) + \mathcal{O}(1/N^j)$. If the signal $s_1^{\alpha\beta}r^T$ is continuous, which is the case with the trapezoidal window $c_2$, then j=2; if there are discontinuities, as with the rectangular window $c_1$, we have only j=1, see FIG. 7b. FIG. 7b also shows implicitly that $s_1^{\alpha\beta}r^T$ satisfies the regularity conditions required in [12] to ensure a $\mathcal{O}(\varepsilon^2)$ error in the demodulation process.

IV. Experimental Results

The whole approach is validated experimentally on a salient PMSM with rated parameters given in table I. The 1-bit $\Sigma\Delta$ modulator has a sampling frequency $T_s^{-1}:=15$ MHz, and the PWM-frequency is $\varepsilon^{-1}:=4$ kHz, thereby the oversampling ration $N=T_s/\varepsilon=3750$. The test scenario is the following: with a load torque of about half the rated torque, the motor starts at rest, slowly accelerates to 3 Hz, then slowly decelerates back to rest and stays there; the whole experiments lasts about 8 s. It is likely that a big part of the error is due to magnetic saturation, not taken into account in the model. There is no theoretical obstruction to handling saturation along the lines developed in [16] for conventional signal injection.

TABLE I

| Rated parameters | | | |
|---|---|---|---|
| Rated power | 400 W | Number of pole pairs n | 2 |
| Rated voltage (RMS) | 400 V | Stator resistance $R_s$ | 4.25 Ω |
| Rated current (RMS) | 1.66 A | d-axis inductance $L_d$ | 43.25 mH |
| Rated speed | 1800 RPM | q-axis inductance $L_q$ | 69.05 mH |
| Rated torque | 2.12N | | |

REFERENCES

[1] P. Jansen and R. Lorenz, "Transducerless position and velocity estimation in induction and salient AC machines," *IEEE Trans. Industry Applications*, vol. 31, pp. 240-247, 1995.

[2] S. Ogasawara and H. Akagi, "Implementation and position control performance of a position-sensorless IPM motor drive system based on magnetic saliency," *IEEE Transactions on Industry Applications*, vol. 34, no. 4, pp. 806-812, 1998.

[3] M. Schroedl, "Sensorless control of AC machines at low speed and standstill based on the "INFORM" method," in *IAS '96. Conference Record of the 1996 IEEE Industry Applications Conference Thirty-First IAS Annual Meeting*, vol. 1, 1996, pp. 270-277 vol. I.

[4] E. Robeischl and M. Schroedl, "Optimized INFORM measurement sequence for sensorless PM synchronous motor drives with respect to minimum current distortion," *IEEE Transactions on Industry Applications*, vol. 40, no. 2, pp. 591-598, 2004.

[5] G. Wang, L. Yang, G. Zhang, X. Zhang, and D. Xu, "Comparative investigation of pseudorandom high-frequency signal injection schemes for sensorless IPMSM drives," *IEEE Transactions on Power Electronics*, vol. 32, no. 3, pp. 2123-2132, 2017.

[6] Q. Gao, G. Asher, M. Sumner, and P. Makys, "Position estimation of AC machines over a wide frequency range based on space vector PWM excitation," *IEEE Transactions on Industry Applications*, vol. 43, pp. 1001-1011, 2007.

[7] C. Wang and L. Xu, "A novel approach for sensorless control of PM machines down to zero speed without signal injection or special PWM technique," *IEEE Transactions on Power Electronics*, vol. 19, no. 6, pp. 1601-1607, 2004.

[8] M. Linke, R. Kennel, and J. Holtz, "Sensorless speed and position control of synchronous machines using alternating carrier injection," in *IEEE International Electric Machines and Drives Conference, 2003. IEMDC'03.*, vol. 2, 2003, pp. 1211-1217 vol. 2.

[9] P. Landsmann, D. Paulus, A. Dötlinger, and R. Kennel, "Silent injection for saliency based sensorless control by means of current oversampling," in *2013 IEEE International Conference on Industrial Technology (ICIT)*, 2013, pp. 398-403.

[10] D. Surroop, P. Combes, P. Martin, and P. Rouchon, "Adding virtual measurements by PWM-induced signal injection," in *American Control Conference*, 2020, pp. 2692-2698.

[11] "Sensorless rotor position estimation by pwm-induced signal injection," in *IECON 2020 The 46th Annual Conference of the IEEE Industrial Electronics Society*, 2020, pp. 367-372.

[12] D. Surroop, P. Combes, and P. Martin, "A demodulation procedure for multicarrier signals with slowly-varying carriers," *ArXiv e-prints*, 2020, arXiv:2011.12853 [eess.SP].

[13] "Error estimate in second-order continuous-time sigma-delta modulators," *ArXiv e-prints*, 2020, arXiv: 2011.12877 [eess.SP].

[14] J. Sorensen, "a δ-conversion used for motor control," in *Proceedings of PCIM Europe 2015; International Exhibition and Conference for Power Electronics, Intelligent Motion, Renewable Energy and Energy Management*, 2015, pp. 1-8.

[15] J. Sorensen, D. O'Sullivan, and S. O'Meara, "Part 2: Optimized sigma-delta modulated current measurement for motor control," 2019.

[16] A. K. Jebai, F. Malrait, P. Martin, and P. Rouchon, "Sensorless position estimation and control of permanent-magnet synchronous motors using a saturation model," *International Journal of Control*, vol. 89, no. 3, pp. 535-549, 2016.

[17] R. Schreier and G. C. Temes, *Understanding delta-sigma data converters*. New York, N.Y.: Wiley, 2005.

C. A Second Scheme to Estimate the Rotor Position of a Permanent Magnet Synchronous Motor Towards an Industrially Implementable PWM-Injection Scheme We show how the rotor position of a salient PMSM can be recovered from the Sigma-Delta output bitstream of the currents. The method is based on the excitation the PWM creates, yielding current ripples that carry information on the position. This is achieved without using a special PWM scheme nor injecting test sequences, thereby opening the way for an industrial application in a common drive.

I. Introduction

Signal injection, introduced in [1], is an effective method for sensorless control of AC motors at low velocity. It consists in superimposing a fast-varying probing signal to the base control law. The current ripple so created provides information on the rotor position if properly decoded. Unfortunately, the probing signal creates acoustic noise and may excite mechanical resonances; for systems controlled through Pulse Width Modulation (PWM), the injection frequency is moreover inherently limited by the PWM frequency, which increases torque ripple.

An appealing idea is to dispense with an external probing signal, and to rely instead on the current ripple naturally created by the PWM. Three main issues must be addressed: i) understand the information encoded in the current ripple; ii) properly demodulate it to extract the rotor position; iii) do it without a "fast" Analog to Digital Converter (ADC) and adapted processing power. Points i) and ii) must of course be dealt with also for signal injection with a probing signal, but are now more complicated. Point iii) is specific to PWM injection, as information is needed inside a PWM cycle, whereas in an industrial drive, usually only one current measurement is acquired and processed per PWM cycle; the technology for "fast" acquisition and processing (fast meaning here about 250 kHz) indeed exists, but is too expensive for implementation in an industrial drive. Several schemes have been proposed; some relying on a modified PWM scheme [2] or through the injection of test sequences [3]-[5]. Whatever the scheme, the problem of estimating the rotor position more or less amounts to estimating the slope of the triangular-shaped current ripple. This can be done with specific current derivative sensors [3], [6], which are experimental devices not found on industrial devices. On the other hand with regular current sensors, the slope can be estimated by the difference between two current samples [7], [8]. But with only two points per PWM signal edge, the estimate is easily corrupted by noise. To achieve better accuracy, a high resolution and high speed sampling ADC is required [7], [9].

In this paper, building on ideas of [10]-[13], we propose and test a rotor position estimation scheme that exploits (nearly) all the information in PWM-induced ripple—hence is much better than two-point slope estimation—, and that is moreover compatible with an industrial drive hardware. The hardware comprises usual current sensors connected to 1-bit $\Sigma\Delta$ modulators, and an FPGA processing the modulators bitstreams. This configuration is common in recent industrial drives, where the modulators serve both for galvanic isolation and as the first stage of a $\Sigma\Delta$ ADC; the FPGA implements the necessary signal processing (usually sinc and decimation filters) to form a complete $\Sigma\Delta$ ADC. The proposed scheme extracts the rotor position directly from the modulators bitstreams by a kind of generalized sinc filter, and can be programmed on the FPGA without further modifications.

II. Virtual Measurement and Position Extraction

A. Model

Consider the state-space model of a PMSM in the dq frame $$\frac{d\phi_s^{dq}}{dt} = u_s^{dq} - R_s i_s^{dq} - \omega \mathcal{J} \phi_s^{dq}, \tag{1a}$$

$$\frac{J}{n}\frac{d\omega}{dt} = m_s^{dq^T} \mathcal{J} \phi_s^{dq} - T_l, \tag{1b}$$

$$\frac{d\theta}{dt} = \omega, \tag{1c}$$

where $\phi_s^{dq}$ is the stator flux linkage, $\omega$ the rotor speed, $\theta$ the rotor position, $i_s^{dq}$ the stator current, $u_s^{dq}$ the stator voltage, and $T_l$ the load torque; $R_s$ the stator resistance, J the moment of inertia and n the number of pole pairs. We assume no magnetic saturation, i.e. linear current-flux relations $$L_d i_s^d = \phi_s^d - \phi_m \tag{2a}$$

$$L_q i_s^q = \phi_s^q, \tag{2b}$$

with $\phi_m$ the permanent magnet flux; see [14] for further details on magnetic saturation pertaining to signal injection. The input is the voltage $u_s^{abc}$ and reads $u_s^{dq} = \mathcal{R}(-\theta)C\ u_s^{abc}$, where $$\mathcal{R}(\theta) := \begin{pmatrix} \cos\theta & -\sin\theta \\ \sin\theta & \cos\theta \end{pmatrix}$$

is the rotation matrix with angle $\theta$ and $$C := \sqrt{\frac{2}{3}} \begin{pmatrix} 1 & -1/2 & -1/2 \\ 0 & \sqrt{3}/2 & -\sqrt{3}/2 \end{pmatrix}$$

is the Clarke transformation.

The voltage is impressed through a Pulse-Width Modulation $u_{pwm}^{abc}$ of $u_s^{abc}$. With $s_0^{abc}(u_s^{abc},\sigma):=u_{pwm}^{abc}-u_s^{abc}$, the impressed voltage reads $$u_{pwm}^{abc} = u_s^{abc} + s_0^{abc}\left(u_s^{abc}, \frac{t}{\varepsilon}\right),$$

where ε is the PWM period. Thus defined $s_0^{abc}$ is 1-periodic with zero mean in the second argument; it can be interpreted as a PWM-induced rectangular injection, which creates current ripples. The only measurement is the current $i_s^{abc} = C^T \mathcal{R}(\theta) i_s^{dq}$, or equivalently $imath_s^{\alpha\beta} = \mathcal{R}(\theta) i_s^{dq}$ since $i_s^a + i_s^b + i_s^c = 0$.

B. Extraction of the Rotor Position from the Virtual Measurement

Assuming the analog currents $i_s^{abc}$ are available, the virtual measurement made available by the impressed PWM voltage is $y_v := \varepsilon \mathcal{S}(\theta)\overline{s_1^{\alpha\beta} r_\varepsilon^T}$. In this expression, $\overline{\phantom{x}}$ denotes the mean over the second argument, namely $\overline{y}(v) := \int_0^1 u(v,\sigma)d\sigma, s_1^{\alpha\beta}(v,\sigma)$ is the zero-mean primitive of $s_0^{\alpha\beta}(v,\sigma) := C s_0^{abc}(v,\sigma)$ with respect to $\sigma, r_\varepsilon(v,\sigma)$ is an arbitrary 1-periodic signal in $\sigma, r_\varepsilon(t) = r(t,t/\varepsilon)$ and $\mathcal{S}(\theta)$ is the so-called saliency matrix introduced in [14]

$$S(\theta) := \frac{L_d + L_q}{2L_d L_q} \begin{pmatrix} 1 + \frac{L_q - L_d}{L_d + L_q}\cos 2\theta & \frac{L_q - L_d}{L_d + L_q}\sin 2\theta \\ \frac{L_q - L_d}{L_d + L_q}\sin 2\theta & 1 - \frac{L_q - L_d}{L_d + L_q}\cos 2\theta \end{pmatrix}.$$

To compute $y_v$ from the currents $i_s^{\alpha\beta} := C i_s^{abc}$, a suitable filtering process is needed. Start by defining the kernel associated with a two-times iterated moving average with window length ε, $$\mathcal{K} := \frac{1}{\varepsilon^2} 1_{[0,\varepsilon]} * 1_{[0,\varepsilon]},$$

as well as the reconstruction kernel $\phi(t):=2\mathcal{K}(t)-\mathcal{K}(t-\varepsilon)$. The properties of these filters are detailed in [15]. Define $\overline{i^{\alpha\beta}} := i_s^{\alpha\beta} * \phi$. Then (see [10] for additional details)

$$[(t_s^{\alpha\beta} - \overline{t_s^{\alpha\beta}})r_\varepsilon^T] * \phi = \varepsilon S(\theta)(s_1^{\alpha\beta} r_\varepsilon^T * \phi) + O(\varepsilon^2) = \varepsilon S(\theta)\overline{s_1^{\alpha\beta} r_\varepsilon^T} + O(\varepsilon^2) = y_v + O(\varepsilon^2) \quad (3)$$

With $r = s_1^{\alpha\beta}$, and using a basic least-squares method, both $\cos 2\theta$ and $\sin 2\theta$ can be estimated from $y_v$ [11], thereby we gain access to the rotor position θ.

III. Filtering of the Sigma-Delta Bitstream

A. PWM-Induced Corruption of the Currents

Figure 9A:
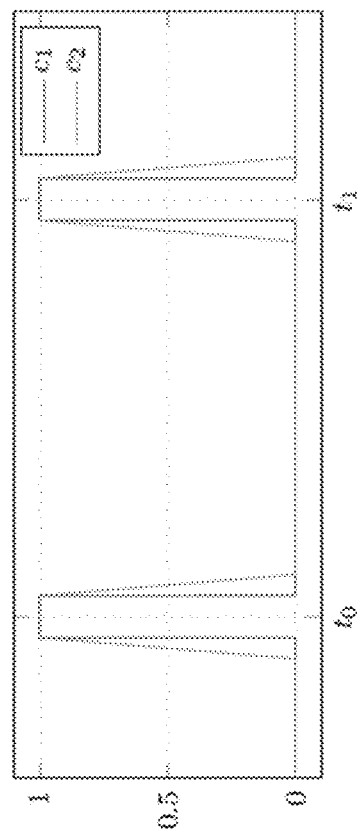
FIG. 9A is a graph showing measured current and its smoothed version.

In the previous section, the rotor position θ is recovered from smoothed oscilloscope data $i_s^{\alpha\beta}$ (see FIG. 9a), i.e. by using a non-causal process, which is of a lesser relevance for industrial applications as it cannot be implemented in real time. As depicted in FIG. 9a, the currents exhibit a strong perturbation every time a commutation of the PWM occurs, due to the discharge of parasite capacitors in the IGBT. Over a period, this event occurs two times, and around 10% of signal is buried under these bursts of noise. Such discharges may corrupt the aforementioned procedure to recover the rotor position. hence the need of covering these undesired perturbations.

Figure 9B:
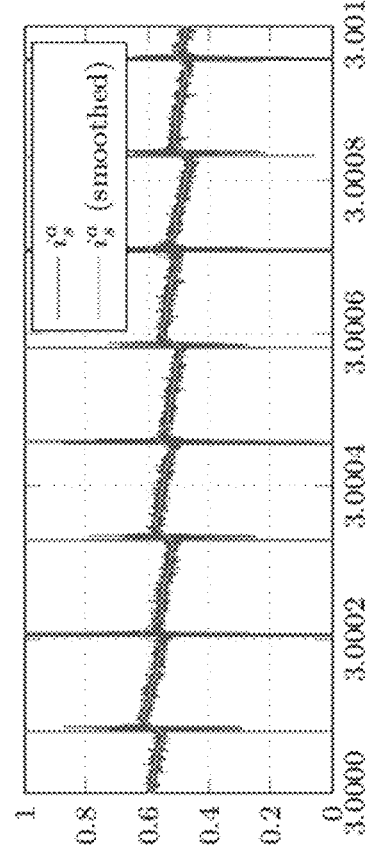
FIG. 9B is a graph showing covers.

One solution consists in computing a window c localised on the PWM switches; namely, c=1 when the perturbation is active, 0 otherwise, and selecting $r:=s_1^{\alpha\beta}(1-c)$ in the filtering process to mitigate the perturbations effects. FIG. 9b displays two potential windows $c_{1,2}$, where $c_1$ is discontinuous, and $c_2$ is continuous and piecewise linear.

B. Filtering of the Sigma-Delta Bitstream

The currents $i_s^{abc}$ are not analogically available, but only as the output bitstream $i_{s,\Sigma\Delta}^{\alpha\beta} \in \{0, 1\}$ of a ΣΔ converter [16], [17], for it ensures galvanic isolation [17]. Nonetheless, the procedure described by equation (3) is still valid when replacing $i_s^{\alpha\beta}$ by its Sigma-Delta encoding. Indeed, the following estimate holds $$[(t_{s,\Sigma\Delta}^{\alpha\beta} - \overline{t_{s,\Sigma\Delta}^{\alpha\beta}})r_\varepsilon^T] * \phi = [(t_s^{\alpha\beta} - \overline{t_s^{\alpha\beta}})(r_\varepsilon^T) * \phi + O(1/N^j) \quad (4a)$$

$$= y_v + O(1/N^j) + O(\varepsilon^2), \quad (4b)$$

where $N = \varepsilon/T_s$ is the oversampling ratio. This estimate is derived following two distinct steps.

On the one hand, equation (4a) stems from the commutation of the reconstruction kernel $\phi$ with the ΣΔ modulator, as detailed in [13]. The additional approximation error $O(1/N^j)$ is inherently limited by the order of the modulator; viz. $j \in \mathbb{N}$ cannot be greater than 2 for a second-order ΣΔ modulator. This value of j also depends on the regularity of $r_\varepsilon$; namely j=1 (resp.=2) if $r_\varepsilon$ is discontinuous (resp. continuous piecewise linear). As $s_1^{\alpha\beta}$ is regular enough (see [10] for further details), the window selection is of utmost importance to increase the filtering resolution.

The estimate (4a) is validated through numerical experiments. Select first arbitrary signals $i_s^{\alpha\beta}$, and $s_1^{\alpha\beta}$, with the latter being continuous piecewise linear. The RMS-error between the two sides of equation (4a) is computed for several values of N and for the two windows $c_{1,2}$—depicted in FIG. 9b—with $r:=s_1^{\alpha\beta}(1-c_i)(i=1,2)$. FIG. 10b shows the asymptotic behavior of the error, and substantiates the error order: $O(1/N)$ (slope approximately equal to 1 in log scale) while using the discontinuous window $c_1$; $O(1/N^2)$ for the continuous piecewise linear window $c_2$.

On the other hand, the complete estimate (4b) is deduced from equation (4a) using the virtual measurement equation (3), with the slight difference that r now embeds the window c (comprehensively proved in [12]). This ultimately means the process described in section II-A by equation (3) holds when replacing $i_s^{\alpha\beta}$ by its ΣΔ encoding $i_{s,\Sigma\Delta}^{\alpha\beta}$ while using windows to cover the burst of noise in the current measurements.

IV. Experimental Results

The whole theory is now validated experimentally on a salient PMSM whose rated parameters are gathered in table I. The currents are recovered from a 1-bit second-order ΣΔ modulator with a sampling frequency $T_s^{-1} = 16$ MHz. The PWM-frequency is set to $\varepsilon^{-1} := 4$ kHz, thereby N=4000. The test scenario is the following: with a load torque of around 50% of the rated torque, the system as well as the reference start and stay at rest from 0 to 2 s, then follow successively a speed ramp from 0 to 3 Hz and another one down to 0 Hz between 2 and 9 s.

The rotor position θ is recovered from the virtual measurement $y_v$ following the procedure described in subsection III-B by equation (4). This means the procedure is applied to the ΣΔ bitstream $i_{s,\Sigma\Delta}^{\alpha\beta}$ of the currents instead of the analog currents. The selected window c is continuous piecewise linear, as illustrated in FIG. 9b.

Figure 11B:
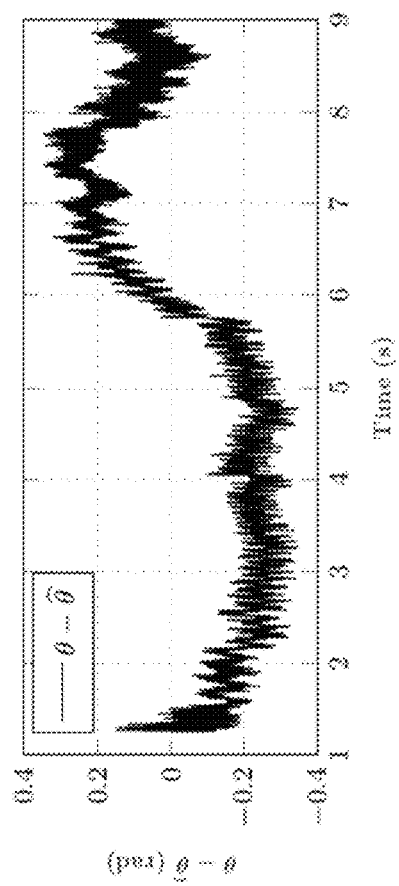
FIG. 11B is a graph showing error between the position and its estimate.
Figure 11A:
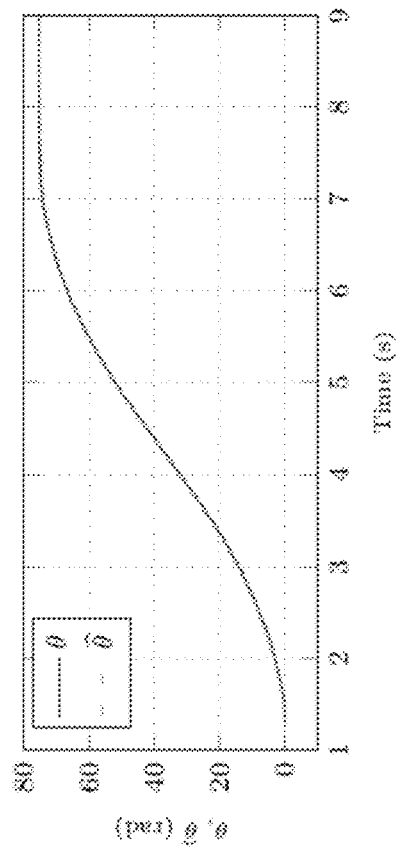
FIG. 11A is a graph showing a position and its estimate.

FIG. 11 displays the position of the rotor θ, the estimate $\hat{\theta}$ (FIG. 11a) along with the error $\theta - \hat{\theta}$ (FIG. 11b), and illustrates the quality of the method, as the error stays bounded by approximately 0.2 rad, and returns to zero when the motor goes back to standstill.

TABLE I

Rated parameters

| Rated power | 400 W | Number of pole pairs n | 2 |
|---|---|---|---|
| Rated voltage (RMS) | 400 V | Stator resistance $R_s$ | 4.25 Ω |
| Rated current (RMS) | 1.66 A | d-axis inductance $L_d$ | 43.25 mH |
| Rated speed | 1800 RPM | q-axis inductance $L_q$ | 69.05 mH |
| Rated torque | 2.12N | | |

V. Conclusion

References

[1] P. Jansen and R. Lorenz, "Transducerless position and velocity estimation in induction and salient AC machines," *IEEE Trans. Industry Applications*, vol. 31, pp. 240-247, 1995.

[2] S. Ogasawara and H. Akagi, "Implementation and position control performance of a position-sensorless IPM motor drive system based on magnetic saliency," *IEEE Transactions on Industry Applications*, vol. 34, no. 4, pp. 806-812, 1998.

[3] M. Schroedl, "Sensorless control of AC machines at low speed and standstill based on the "INFORM" method," in *IAS '96. Conference Record of the 1996 IEEE Industry Applications Conference Thirty-First IAS Annual Meeting*, vol. 1, 1996, pp. 270-277 vol. I.

[4] E. Robeischl and M. Schroedl, "Optimized INFORM measurement sequence for sensorless PM synchronous motor drives with respect to minimum current distortion," *IEEE Transactions on Industry Applications*, vol. 40, no. 2, pp. 591-598, 2004.

[5] G. Wang, L. Yang, G. Zhang, X. Zhang, and D. Xu, "Comparative investigation of pseudorandom high-frequency signal injection schemes for sensorless IPMSM drives," *IEEE Transactions on Power Electronics*, vol. 32, no. 3, pp. 2123-2132, 2017.

[6] Q. Gao, G. Asher, M. Sumner, and P. Makys, "Position estimation of AC machines over a wide frequency range based on space vector PWM excitation," *IEEE Transactions on Industry Applications*, vol. 43, pp. 1001-1011, 2007.

[7] C. Wang and L. Xu, "A novel approach for sensorless control of PM machines down to zero speed without signal injection or special PWM technique," *IEEE Transactions on Power Electronics*, vol. 19, no. 6, pp. 1601-1607, 2004.

[8] M. Linke, R. Kennel, and J. Holtz, "Sensorless speed and position control of synchronous machines using alternating carrier injection," in *IEEE International Electric Machines and Drives Conference, 2003. IEMDC'03.*, vol. 2, 2003, pp. 1211-1217 vol. 2.

[9] P. Landsmann, D. Paulus, A. Dötlinger, and R. Kennel, "Silent injection for saliency based sensorless control by means of current oversampling," in *2013 IEEE International Conference on Industrial Technology (ICIT)*, 2013, pp. 398-403.

[10] D. Surroop, P. Combes, P. Martin, and P. Rouchon, "Adding virtual measurements by PWM-induced signal injection," in *American Control Conference*, 2020, pp. 2692-2698.

[11] "Sensorless rotor position estimation by pwm-induced signal injection," in *IECON 2020 The 46th Annual Conference of the IEEE Industrial Electronics Society*, 2020, pp. 367-372.

[12] D. Surroop, P. Combes, and P. Martin, "A demodulation procedure for multicarrier signals with slowly-varying carriers," *ArXiv e-prints*, 2020, arXiv:2011.12853 [eess.SP].

[13] "Error estimate in second-order continuous-time sigma-delta modulators," *ArXiv e-prints*, 2020, arXiv: 2011.12877 [eess.SP].

[14] A. K. Jebai, F. Malrait, P. Martin, and P. Rouchon, "Sensorless position estimation and control of permanent-magnet synchronous motors using a saturation model," *International Journal of Control*, vol. 89, no. 3, pp. 535-549, 2016.

[15] D. Surroop, P. Combes, P. Martin, and P. Rouchon, "A new demodulation procedure for a class of multiplexed signals," in *Annual Conference of the IEEE Industrial Electronics Society (IECON)*, 2019, pp. 48-53.

[16] J. Sorensen, "a δ-conversion used for motor control," in *Proceedings of PCIM Europe 2015; International Exhibition and Conference for Power Electronics, Intelligent Motion, Renewable Energy and Energy Management*, 2015, pp. 1-8.

[17] J. Sorensen, D. O'Sullivan, and S. O'Meara, "Part 2: Optimized sigma-delta modulated current measurement for motor control," 2019.

[18] R. Schreier and G. C. Temes, *Understanding delta-sigma data converters*. New York, N.Y.: Wiley, 2005.

The invention claimed is:

1. A variable speed drive for the closed loop control of the operation of an AC electric motor based on a given control law, the variable speed drive comprising:
   an output terminal for delivering a controlled alternating drive voltage to the controlled AC electric motor;
   a solid-state power inverter including solid-state switches for generating the drive voltage by commutating the solid-state switches to invert a provided DC voltage;
   a drive controller for controlling the generation of the drive voltage by the power inverter; and
   a drive current sensing device for measuring the instantaneous intensity of the drive current taken up by the controlled AC electric motor, and for providing the resulting measurements as a drive current intensity signal to the drive controller, wherein the drive controller includes:
      a pulse-width modulation generator;
      a control law module storing the given control law; and
      a state variable estimation module for estimating the instantaneous value of at least one state variable of the controlled AC electric motor,
   wherein the control law module is adapted to, based on the stored control law and state variable estimates provided by the estimation module, compute a target voltage signal and output the computed target voltage signal to the pulse-width modulation generator,
   wherein the pulse-width modulation generator is adapted to:
      approximate the received target voltage signal with a pulse-width modulated inverter control signal;
      control the operation of the power inverter using the inverter control signal, thereby obtaining the drive voltage;
      compute, based on the deviation between the inverter control signal and the target voltage signal, a state variable estimation support signal;

extract, from the inverter control signal, a time sequence of the next commutations of the power inverter's solid-state switches; and output the computed state variable estimation support signal and the extracted commutation time sequence to the state variable estimation module, and wherein the state variable estimation module is adapted to:

estimate the instantaneous value of a state variable of the AC electric motor based on the received state variable estimation support signal and the drive current intensity signal provided by the drive current sensing device wherein those time segments of the drive current intensity signal, which, according to the received commutation time sequence, correspond to the commutation of one of the power inverter's solid-state switches, are discarded in the state variable estimation as corrupted time segments; and output the resulting state variable estimate to the control law module.

2. The variable speed drive of claim 1, wherein the state variable estimation module is adapted to use a sequence of temporal masking windows, which follows the commutation time sequence, to determine those time segments of the drive current intensity signal which are discarded.

3. The variable speed drive of claim 2, wherein the full width at maximum, FWM, of the temporal masking windows is greater than or equal to the switching time of the power inverter's solid-state switches.

4. The variable speed drive of claim 2, wherein the temporal masking windows have a discontinuous shape, such as a rectangular shape.

5. The variable speed drive of claim 2, wherein the temporal masking windows have a continuous shape, such as a trapezoidal shape.

6. The variable speed drive of claim 1, further comprising a 1-bit delta-sigma modulator adapted to:
receive the drive current intensity signal in analog form from the drive current sensing device;
convert the received analog drive current intensity signal into a binary bitstream; and
output the binary bitstream to the drive controller.

7. The variable speed drive of claim 6, wherein the delta-sigma modulator is a second-order continuous-time delta-sigma modulator.

8. The variable speed drive of claim 1, further comprising a multi-bit analog-to-digital converter adapted to:
receive the drive current intensity signal in analog form from the drive current sensing device;
convert the received analog drive current intensity signal into a digital drive current intensity signal; and
output the digital drive current intensity signal to the drive controller.

9. The variable speed drive of claim 1, wherein the variable speed drive is a three-phase variable speed drive, and thus the controlled alternating drive voltage is a three-phase voltage, the power inverter is a three-phase inverter, and the drive current intensity signal is a three-phase current signal.

10. The variable speed drive of claim 9, further comprising:
a 1-bit delta-sigma modulator adapted to:
receive the drive current intensity signal in analog form from the drive current sensing device,
convert the received analog drive current intensity signal into a binary bitstream, and
output the binary bitstream to the drive controller, and
three 1-bit delta-sigma modulators, one for each phase of the drive current intensity signal.

11. The variable speed drive of claim 9, further comprising:
a multi-bit analog-to-digital converter adapted to:
receive the drive current intensity signal in analog form from the drive current sensing device,
convert the received analog drive current intensity signal into a digital drive current intensity signal, and
output the digital drive current intensity signal to the drive controller; and
three multi-bit analog-to-digital converters, one for each phase of the drive current intensity signal.

12. An electric drive assembly comprising a synchronous reluctance motor and a variable speed drive of claim 1 for controlling the synchronous reluctance motor.

13. An electric drive assembly comprising a permanent-magnet synchronous motor and a variable speed drive of claim 1 for controlling the permanent-magnet synchronous motor.

14. A method of controlling, in a closed loop, the operation of an AC electric motor based on a given control law, the method comprising:
a) measuring the instantaneous intensity of the drive current taken up by the controlled AC electric motor;
b) estimating the instantaneous value of a state variable of the AC electric motor using the measured drive current intensity;
c) computing, based on the given control law and the estimated state variable, a target voltage signal;
d) approximating the computed target voltage signal with a pulse-width modulated inverter control signal;
e) computing, based on the deviation between the inverter control signal and the target voltage signal, a state variable estimation support signal;
f) generating a controlled alternating drive voltage by inverting a provided DC voltage through the commutation of solid-state switches in accordance with the inverter control signal; and
g) delivering the generated drive voltage to the controlled AC electric motor; wherein the state variable estimation according to step b):
relies on the state variable estimation support signal computed in step e) as an additional input together with the drive current intensity measured in step a); and
is suspended during each commutation of one of the solid-state switches.

* * * * *